United States Patent [19]
Rex et al.

[11] Patent Number: 5,811,478
[45] Date of Patent: Sep. 22, 1998

[54] ANTI-YELLOWING MOLDING COMPOSITIONS

[75] Inventors: Gary Charles Rex, Nitro; Kenneth Earl Atkins, South Charleston, both of W. Va.

[73] Assignee: Union Carbide Chemicals & Plastics Technology Corporation, Danbury, Conn.

[21] Appl. No.: 780,043

[22] Filed: Dec. 23, 1996

Related U.S. Application Data

[60] Provisional application No. 60/011,210 Feb. 5, 1996.

[51] Int. Cl.⁶ .............................. C08K 5/49; C08F 8/00; C08F 20/00
[52] U.S. Cl. ................ 524/115; 525/11; 525/31; 525/43; 525/168; 525/437; 525/438; 525/444.5; 525/445; 524/115; 524/123; 524/126; 524/127; 524/128; 524/221
[58] Field of Search ................... 525/11, 31, 43, 525/168, 437, 438, 445, 444.5; 524/115, 123, 126, 127, 128, 221

[56] References Cited

U.S. PATENT DOCUMENTS

| | | | |
|---|---|---|---|
| 4,491,642 | 1/1985 | Atkins | 523/515 |
| 4,524,162 | 6/1985 | Domeier | 523/438 |
| 4,525,498 | 6/1985 | Atkins et al. | 523/511 |
| 4,555,534 | 11/1985 | Atkins | 523/507 |
| 4,673,706 | 6/1987 | Atkins | 525/31 |
| 5,194,334 | 3/1993 | Uerdingen et al. | 428/416 |

OTHER PUBLICATIONS

Advances in Pigmentation of Low Profile Composites, Part IV—K.E. Atkins, G.C. Rex and R.L. Seats, Reprinted from 51st Annual Conference and Expo '96 Proceedings of the SPI/CI 51st Annual Conference GE Specialty Chemicals, Inc. Product Guide CA–40011.

*Primary Examiner*—Samuel A. Acquah
*Attorney, Agent, or Firm*—W. K. Volles

[57] ABSTRACT

Molding compositions comprising certain epoxy compounds, at least one antioxidant, an unsaturated thermosetting resin and an olefinically unsaturated monomer are disclosed. The disclosed compositions can provide enhanced yellowing resistance to articles molded from the compositions, particularly when the molding compositions contain white pigment. Processes from molding articles having enhanced yellowing resistance are also disclosed.

52 Claims, No Drawings

ANTI-YELLOWING MOLDING COMPOSITIONS

This application is a provisional application Ser. No. 60/011,210 filed Feb. 5, 1996.

FIELD OF THE INVENTION

The present invention generally relates to molding compositions suitable for molding thermoset articles. More specifically, the present invention relates to molding compositions containing certain epoxy compounds and processes for using such molding compositions in order to manufacture molded articles which can have enhanced anti-yellowing resistance.

BACKGROUND OF THE INVENTION

In general, degradation of a polymer, that is any undesirable change in its characteristics, can occur in the presence of heat or light, and oxygen. The degradation is usually the result of a free radical mechanism. Polymer properties are highly dependent on molecular weight and as such, reactions that alter the molecular weight must be controlled. Degradation initially occurs at the surface of an article, e.g., where there is greatest exposure to oxygen. A byproduct of degradation is yellowing of the polymer which occurs most noticeably at the surface.

The polymeric matrix of thermosetting molding compounds such as sheet molding compound ("SMC") and bulk molding compound ("BMC") is susceptible to degradation. For many applications, and particularly white pigmented applications, e.g., for appliances, resistance to yellowing is a critical parameter. Unsaturated polyester resins when crosslinked with an olefinically unsaturated monomer, such as, for example, styrene or methyl methacrylate, can yellow appreciably when exposed to heat or UV radiation in the presence of oxygen. If exposed long enough, embrittlement can also occur.

Two important reactions that alter molecular weight are chain scission and crosslinking.

Under the influence of heat or light, chain scission can occur and if no oxygen is present, recombination of the free radicals usually follows.

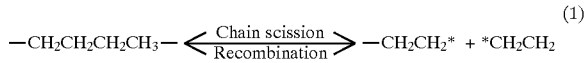

(1)

However in the presence of oxygen which is usually the case, a very fast reaction can occur between the polymer free radical and oxygen to give a peroxy radical. One possible mechanism is shown below.

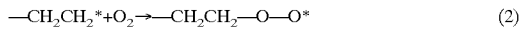

(2)

The peroxy radical can react with other radicals to give peroxides.

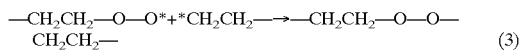

(3)

Alternatively, it may abstract a hydrogen atom from an adjacent polymer chain to give a hydroperoxide and another polymer radical.

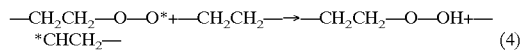

(4)

The reaction sequence set forth above illustrates a permanent chain scission reaction. If the polymer radical reacts with another polymer radical, then crosslinking would also take place. However, another oxygen may also react giving a peroxy radical. In addition, the hydroperoxide moiety is very unstable at high temperatures and could break down giving two additional radicals that continue the degradation reactions. Thus, the degradation process when aided by oxygen can occur quite rapidly leading to loss in the physical properties and premature failure of the molded article. However, before a significant loss in properties occurs, the surface of the article will typically yellow considerably.

An important result of the degradation reaction is yellowing. Yellowing indicates an increase in chromophoric groups such as ketones, aldehydes, carboxylic acids, and conjugated double bonds. Below is an example of how an aldehyde would be produced starting with the secondary alkyl radical of step (4) above.

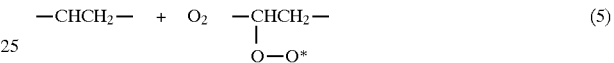

(5)

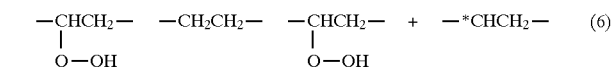

(6)

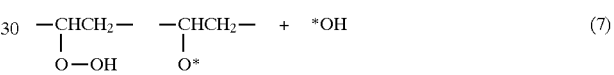

(7)

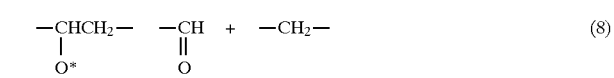

(8)

Based on the above described mechanism, it would appear that the cycle of generating free radicals and hydroperoxides would continue unless a radical scavenger, or antioxidant, is utilized to break the cycle.

Accordingly, improved molding compositions are desired which can have enhanced resistance to yellowing, particularly for pigmented applications, e.g., white pigment, where yellowing is particularly undesirable. Processes for manufacturing articles having enhanced yellowing resistance are also desired.

SUMMARY OF THE INVENTION

By the present invention, it is now possible to provide SMC and BMC molded articles having enhanced yellowing resistance. In accordance with the present invention, molding compositions comprising one or more antioxidants in combination with epoxy compounds are provided. It has been found that the combination of the antioxidants and the epoxy compound can provide enhanced yellowing resistance to articles molded from such compositions. The molding compositions of the present invention are particularly suitable for molding pigmented compositions, e.,g. white pigmented compositions, which also require dimensional control and thus often incorporate a thermoplastic additive, e.g., polyvinyl acetate.

In a preferred aspect of the invention, the molding compositions comprise the epoxy compound, a primary antioxidant which functions to donate hydrogen radicals to deactivate polymer free radicals present in articles molded from the molding compositions, and a secondary antioxidant which functions to decompose hydroperoxides present in articles molded from the molding compositions. Quite advantageously, it has been found that the presence of polyvinyl acetate can function to solubilize the primary antioxidant in the presence of an olefinicially unsaturated monomer, e.g., styrene, thereby making it possible to provide a liquid composition comprising the epoxide, the primary antioxidant, the secondary antioxidant, polyvinyl acetate and the olefinically unsaturated monomer.

DETAILED DESCRIPTION OF THE INVENTION

The epoxy compounds of this invention comprise at least one 1,2 epoxy group per molecule and can be based, for example, on aliphatic, cycloaliphatic or aromatic backbones. Thus, for example, are included the bisphenol A based epoxy resins.

One class of preferred epoxy compounds can be represented by the formula:

wherein n is an integer representing the number of repeating units and has a value of 0 to about 10 and Z is an arylene radical having 6 to about 20 carbons. The preferred arylene radical is:

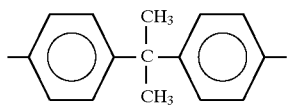

Another preferred class of epoxy compounds are cycloaliphatic epoxides. They are exemplified by the following:

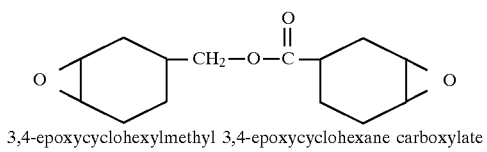
3,4-epoxycyclohexylmethyl 3,4-epoxycyclohexane carboxylate

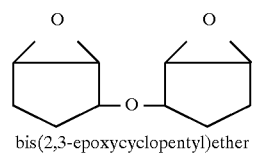
bis(2,3-epoxycyclopentyl)ether

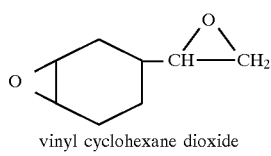
vinyl cyclohexane dioxide

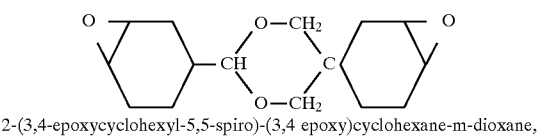
2-(3,4-epoxycyclohexyl-5,5-spiro)-(3,4 epoxy)cyclohexane-m-dioxane,

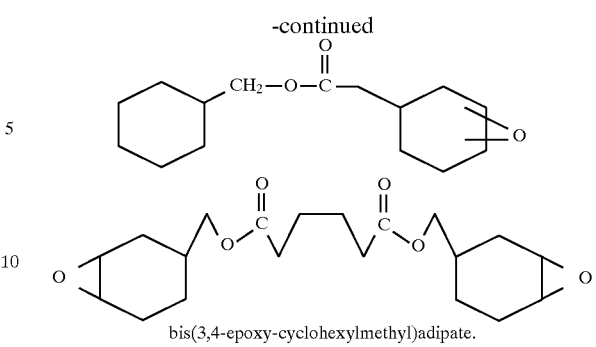
bis(3,4-epoxy-cyclohexylmethyl)adipate.

A general description of such epoxy compounds is presented, for example, in the Encyclopedia of Polymer Science and Technology, pp. 209–216, Vol. 6, Interscience Publishers, N.Y.C. 1967.

A representative example of an aliphatic epoxy compound is epoxidized polybutadiene.

The epoxy compounds employed in this invention are preferably essentially free of reactive unsaturation. Some residual unsaturation may however be present in the epoxy compounds as normal impurity levels based on typical commercial operations. The residual unsaturation impurity levels should not be greater than about 25 weight percent, preferably not greater than about 10 weight percent, and most preferably not greater than about 5 weight percent, of the total weight of the epoxy compound. Any residual unsaturation impurities remaining in the epoxy compounds employed in this invention preferably have a reactivity ratio ($r_1$) with styrene of greater than 1, more preferably greater than 5, and most preferably greater than 20. Measuring the reactivity ratios of compounds is well known in the art as described, for example, in F. W. Billmeyer, Jr., Textbook of Polymer Science, Wiley-Interscience, pages 329–331.

The amount of the epoxy compounds used in the molding compositions of the present invention typically ranges from about 1 to 5 parts per hundred resin ("phr"), preferably from about 1 to 4 phr, and more preferably from about 2 to 3 phr. As used herein, the term "phr" means the number of parts of the particular ingredient per 100 parts of resin wherein the resin is the sum of the concentration of unsaturated thermosetting resin, olefinically unsaturated monomer and thermoplastic additive (when present). One or more epoxy compounds can be used in the molding compositions of the present invention. Further details concerning the selection and amount of epoxy compounds are known to those skilled in the art.

The antiyellowing activity of epoxides in unsaturated polyester molding compounds is not as well understood as that of the primary and secondary antioxidants. Without being bound to any particular theory, one could speculate that the epoxide is acting as a scavenger for acidic decomposition products of the organic polymeric matrix. These acidic by products if not scavenged may potentially oxidize any polymers present thereby yellowing the article.

The antioxidants suitable for use in the molding compositions of the present invention can be any antioxidants which are effective to enhance the yellowing resistance of articles molded from the molding compositions. Preferably, the molding compositions contain primary antioxidant functionality and secondary antioxidant functionality. Primary antioxidants, e.g., hindered phenolic compounds, function to donate hydrogen radicals to deactivate polymer free radicals present in articles molded from the molding compositions. Secondary antioxidants, e.g., phosphites, function to decompose hydroperoxides present in articles molded from the molding compositions by reduction to alcohols. In accordance with the present invention, it has been found that the primary antioxidant can terminate the oxidative chain breaking reaction, and when a secondary antioxidant is combined with a primary antioxidant, a synergistic effect can result.

Preferably, the antioxidants are selected from the group consisting of hindered phenols, phosphites, phosphines, phosphonites, thioethers, arylamines, hindered amines, hydroxy amines or mixtures thereof.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)methylcarboxyethyl)]sulfide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; thio compounds such as dilaurylthiodipropionate, dimyristylthiodipropionate, and distearylthiodipropionate; various stability functionalized siloxanes; and various amines such as polymerized 2,2,4-trimethyl-1,2-dihydroquinoline.

Preferred primary antioxidants are hindered phenolics, such as, for example, t-butyl catechol, butylated hydroxy toluene, hydroquinone, p-benzoquinone, butylated hydroxyanisole, di-tert-butyl-p-cresol and propyl gallate. Especially preferred primary antioxidants are tetrakis [methylene (3,5-di-tert-butyl-4-hydroxyhydrocinnamate)] methane and acetdecyl 3,5-di-tert-butyl-4-hydroxyhydrocinnamate.

The amount of primary antioxidant that can be used in the molding compositions of the present invention typically ranges from about 0.1 to 1.5 phr, preferably from about 0.1 to 1.0 phr and more preferably from about 0.3 to 0.5 phr.

Preferred secondary antioxidants are phosphites, e.g., alkyl phosphites, aryl phosphites and alkyl-aryl phosphites. Especially preferred secondary antioxidants are phosphites which comprise aryl groups, e.g., aryl phosphites and alkyl-aryl phosphites, such as, for example, tris(nonylphenyl) phosphite.

The amount of secondary antioxidant that can be used in the molding compositions of the present invention typically ranges from about 0.5 to 5 phr, preferably from about 0.5 to 3 phr and more preferably from about 1 to 2 phr. Further details concerning the selection and amount of antioxidants are known to those skilled in the art.

Primary and secondary antioxidants are commercially available from a variety of sources, e.g., from G.E. Specialty Chemicals, Inc., Parkersburg, W. Va.

The unsaturated thermosetting resins suitable for use in accordance with the present invention include those unsaturated polymeric materials which can be crosslinked to form thermoset articles. Typically, the unsaturated thermosetting resins have an average molecular weight of at least 500, preferably from about 500 to 10,000 grams per gram mole ("g/gmole"). As used herein the term average molecular weight means weight average molecular weight. Methods for determining weight average molecular weight are known to those skilled in the art. One preferred method for determining weight average molecular weight is gel permeation chromatography.

Typical unsaturated thermosetting resins include, for example, epoxy diacrylates, polyester diacrylates, polyurethane diacrylates, acrylate capped polyurethane polyacrylates, acrylated polyacrylates, acrylated polyethers and the like. Especially preferred thermosetting resins include polyesters and vinyl esters. As used herein, the term "polyesters" includes vinyl esters. Such unsaturated thermosetting resins are commercially available or alternatively can be readily prepared by those skilled in the art. Examples of suitable unsaturated thermosetting resins for use in accordance with the present invention are described for example in U.S. Pat. Nos. 4,172,059 and 4,942,001.

One or more unsaturated thermosetting resins may be employed in the molding compositions of the present invention. The total amount of unsaturated thermosetting resins in the molding compositions of the present invention is typically from about 15 to 80 phr, preferably from about 20 to 60 phr, and more preferably from about 25 to 50 phr. Further details concerning the selection and amounts of unsaturated thermosetting resins are known to those skilled in the art.

The olefinically unsaturated monomers (also referred to herein as "crosslinking monomers") suitable for use in accordance with the present invention include materials which are copolymerizable with the unsaturated thermosetting resins. The monomer also serves the function of dissolving the thermosetting resin thereby by facilitating its interaction with the other components of the molding composition. Preferably, the olefinic unsaturation is due to ethylenic unsaturation. Typical olefinically unsaturated monomers include, for example, styrene, vinyl toluene isomers, methyl methacrylate, acryl nitrile and substituted styrene such as, for example, chlorostyrene and alphamethylstyrene. Multifunctional monomers, such as, for example, divinylbenzene or multifunctional acrylates or methacrylates may also be employed. Styrene is a preferred monomer for use in the compositions of the present invention.

One or more olefinically unsaturated monomers may be used in the molding compositions of the present invention. Typically, the total amount of the olefinically unsaturated monomers is from about 20 to 80 phr, preferably from about 30 to 65 phr, and more preferably from about 40 to 55. Such monomers are readily commercially available. Further details concerning the selection and amounts of the olefinically unsaturated monomers are known to those skilled in the art.

The compositions of the present invention preferably comprise a thermoplastic additive, e.g., low profile additive. Typical of such thermoplastic additives include for example, polystyrene, polyvinyl acetate homopolymers and copolymers, e.g., vinyl acetate copolymerized with acrylic acid, crotonic acid, vinyl chloride, polyurethanes, saturated straight-chain and cyclic polyesters, polyalkyl acrylates, or methacrylates and the like. Polyvinyl acetates are preferred thermoplastic additives for use in accordance with the present invention.

The weight average molecular weights of the thermoplastic additives of the present invention are from about 10,000 to 250,000, preferably from about 25,000 to 200,000 and more preferably from about 50,000 to 180,000 g/gmole. These thermoplastic additives can be used in conjunction with lower molecular weight materials which can enhance their shrinkage control ability such as epoxys, lower reactivity secondary monomers and others. Examples of such approaches are disclosed in U.S. Pat. Nos. 4,525,498, 4,755, 557, and 4,374,215.

One or more thermoplastic additives may be employed in the compositions of the present invention. Typically, the total amount of the thermoplastic additives is from about 3 to 30 phr, preferably from about 5 to 25 phr, and more preferably from about 8 to 20 phr. Further details of the thermoplastic additives suitable for use in accordance with the present invention are described, for example, in U.S. Pat. No. 4,172,059. Such thermoplastic additives are commercially available or alternatively can be prepared by those skilled in the art. Further details concerning the selection and amounts of the thermoplastic additives are known to those skilled in the art.

One or more viscosity reducing additives may be employed in the compositions of the present invention. Typically, the amount of the viscosity reducing additive is from about 0.5 to 10 phr, preferably from about 1 to 7 phr, and more preferably from about 2 to 5 phr. Such viscosity reducing additives are commercially available or alternatively can be prepared by those skilled in the art. Further details concerning the selection and amounts of the viscosity reducing additives are known to those skilled in the art.

The compositions of the present invention may also comprise one or more thickeners, e.g., alkaline earth metal oxides or hydroxides. For example, such materials may be selected from the group consisting of magnesium oxide, magnesium hydroxide, calcium oxide, calcium hydroxide, zinc oxide, barium oxide and mixtures thereof. Preferably, the thickener when used comprises two or more alkaline earth metal oxides or hydroxides. The total amount of thickener suitable for use in the molding compositions of the present invention is from about 0.5 to 10 phr, preferably from about 1 to 8 phr, and more preferably from about 2 to 6 phr. The materials which comprise the thickeners of the present invention are readily commercially available.

Reinforcements are also often employed in the molding compositions of the invention and can be, for example, any of those known to the art for use in molding compositions. Examples of such materials are glass fibers or fabrics, carbon fibers and fabrics, asbestos fibers or fabrics, various organic fibers and fabrics such as those made of polypropylene, acrylonitrile/vinyl chloride copolymer, and others known to the art. These reinforcing materials are typically employed in the molding compositions at a level of from about 5 to 80 phr, preferably 15 to 50 phr.

In addition to the above-described ingredients, the molding compositions of the present invention also frequently contain pigment. The amount of pigment may vary widely, depending on the particular molding composition and pigment used. It is typically employed in the range of about 0.5 to 15 phr. Typical pigments include for example, carbon black, titanium dioxide and zinc sulfide. Zinc sulfide and titanium dioxide are particularly preferred for producing white pigmented compositions. Further details concerning the selection of appropriate pigments to achieve the desired coloration are known to those skilled in the art.

In one preferred aspect of the present invention, the pigment is combined with a thermoplastic additive, e.g., polyvinyl acetate, to produce pellets, preferably comprising from about 20 to 40 weight percent and more preferably, about 30 weight percent of the pigment, e.g., zinc sulfide, with the balance comprising the thermoplastic additive. Such pellets when dissolved in styrene or any other crosslinking monomer can produce a low profile additive that can provide both shrinkage control and pigmentation when formulated into the molding compositions.

The molding compositions of the invention may also contain one or more other conventional additives, which are employed for their known purposes in the amounts known to those skilled in the art. The following are illustrative of such additives:

1. Polymerization initiators such as t-butyl hydroperoxide, t-butyl perbenzoate, benzoyl peroxide, t-butyl peroctoate, cumene hydroperoxide, methyl ethyl ketone peroxide, peroxy ketals, and others known to the art, to catalyze the reaction between the olefinically unsaturated monomer and the thermosetting resin. The polymerization initiator is employed in a catalytically effective amount, such as from about 0.3 to about 3 phr.

2. Fillers such as clay, alumina trihydrate, silica, calcium carbonate, and others known to the art; and 3. Mold release agents or lubricants, such as zinc stearate, calcium stearate, and others known to the art.

The molding compositions of the present invention can be prepared by methods known to those skilled in the art, such as for example, mixing the components in a suitable apparatus such as Hobart mixer at temperatures on the order of about 20° to 50° C. The components may be combined in any convenient order. Generally, it is preferable that the thermosetting resin, epoxy compound, antioxidant, and thermoplastic additive are added in liquid form by preparing a solution thereof in the crosslinking monomer. All the liquid components are then typically mixed together before adding the fillers, thickening agents and optional ingredients.

Once formulated, the molding compositions can be molded into thermoset articles of the desired shape, e.g., automotive fenders, hoods, appliances, bathtubs, doors, and the like. The specific conditions used in the molding process depend on the composition being molded as well as upon the nature of the particular articles desired, the details of which are known to those skilled in the art. Typical molding pressures for use in accordance with the present invention are from about 30 to 2,000 psig, preferably from about 200 to 1500 psig, and more preferably from about 350 to 1000 psig. Suitable molding temperatures are from about 80° to 180° C., preferably from about 100° to 160° C. and more preferably from about 120° to 150° C. Typical molding time periods range from about 0.5 to about 5 minutes or longer.

In accordance with the present invention, methods are provided for enhancing the yellowing resistance of molded articles by using the molding compositions described herein to mold such articles. Also, the invention provides additive compositions which can be incorporated into molding compositions in order to enhance the yellowing resistance of articles molded therefrom. Typically, the additive compositions comprise from about 50 to 99 wt % and preferably from about 70 to 95 wt % of the epoxide and from about 1 to 99 wt % and preferably from about 5 to 30 wt % of at least one antioxidant, i.e., the primary antioxidant and/or the secondary antioxidant, based on the total weight of the additive composition. Preferably, the additive composition further comprises from about 10 to 60 wt % and more preferably from about 30 to 60 wt % of the olefinically unsaturated monomer, e.g., styrene, based on the total weight of the additive composition. More preferably, the additive compositions further comprise from about 1 to 40 wt %, and more preferably from about 5 to 40 wt % of the thermoplastic additive, e.g., polyvinyl acetate, based on the total weight of the additive composition. Quite surprisingly, it has been found in accordance with the present invention, that the polyvinyl acetate can solubilize the primary antioxidant, e.g., phenolic, which is normally insoluble in olefinically unsaturated monomers, such as styrene. Thus, an especially preferred additive composition in accordance with the present invention comprises from about 1 to 20 wt % of the epoxide, from about 0.1 to 5 wt % of the primary antioxidant, from about 0.1 to 5 wt % of the secondary antioxidant, from about 30 to 70 wt % of the olefinically unsaturated monomer, e.g., styrene, and from about 20 to 50% of the thermoplastic polymer, e.g., polyvinyl acetate, based on the total weight of the additive composition.

The following examples are provided for illustrative purposes and are not intended to limit the scope of the claims which follow.

The following materials were used in the examples set forth below:

DEFINITIONS p-BQ—A 5 wt % solution of parabenzoquinone in diallylphthalate.

Calcium Carbonate—A calcium carbonate filler having a particle size of 5 microns and sold by Omya Corp.

MgO—A 38 wt % dispersion of magnesium oxide in a low molecular weight saturated polyester sold by Plasticolors, Inc., Ashtabula, Ohio. as PG-9033.

Polystyrene—A non carboxylated polystyrene at 33 wt % solids in styrene monomer sold by Ashland Chemical Company, Columbus, Ohio under the product name MR-63004.

Ortho UPE—a highly reactive orthophthalic acid modified maleic anhydride- propylene glycol polyester, available from Ashland Chemical, Columbus, Ohio.

XLP-4072 30 wt % zinc sulfide/70 wt % poly(vinyl acetate) at a concentration of 48–50 wt % dissolved in styrene, available from Union Carbide Corp., Danbury, Conn.

XLP-4074 30 wt % titanium dioxide/70 wt. %poly(vinyl acetate) at a concentration of 48–50 wt % dissolved in styrene, available from Union Carbide Corp., Danbury, Conn.

LP-4016—poly(vinyl acetate) dissolved in a 60 wt. % styrene solution, available from Union Carbide Corp., Danbury, Conn.

Peroxy ketal—1,1 Di-(t-amylperoxy cyclohexane), available from Atochem, Buffalo, N.Y.

Zinc Sulfide—zinc sulfide as a 70 wt % dispersion in a low molecular weight saturated polyester, available from Plasticolors, Inc., Ashtabula, Ohio.

ZnSt—zinc stearate, available from Synthetic Products, Cleveland, Ohio.

VR-3—a saturated fatty acid, available from Union Carbide Corporation, Danbury, Conn.

Epoxide 1—3,4-epoxycyclohexylmethyl, 3,4-epoxycyclohexane carboxylate, available from Union Carbide Corporation, Danbury, Conn.

Epoxide 2—octyl epoxy tallate, available from Union Carbide Corporation, Danbury, Conn.

Primary Antioxidant—tetrakis [methyl(3,5-di-tert-butyl-4-hydroxyhydrocinnamate)]methane, available from GE Specialty Chemicals, Inc., Parkersburg, W. Va.

Secondary Antioxidant—tris(nonylphenyl)phospite containing about 0.75 wt. % of trisisopropylamine, available from GE Specialty Chemicals, Inc., Parkerburg, W. Va.

General Procedure for Preparation of Bulk Molding Compound (BMC) Formulations

All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3–4 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent was mixed into the paste over a period of 2–3 minutes, the mixer was again stopped and ~175 grams of the paste were removed from the pan (using a large spatula) and transferred to a wide-mouthed 4 oz. Bottle. This paste sample was stored in the capped bottle at room temperature and the viscosity was measured periodically using a Model HBT 5X Brookfield Synchro-Lectric Viscometer on a Helipath Stand. Typical viscosities ranged from 50,000 to 250,000 centipoise ("cP").

After removal of the paste sample, the contents were reweighed and styrene loss made up, the chopped glass fibers were added slowly (from an ice cream carton) to the pan with the mixer running on slow speed. The mixer was run for ~30 seconds after all the glass was in the paste. This short time gave glass wet out without glass degradation. The pan was then removed from the mixer and separate portions of the BMC mix of ~450 grams each were removed using spatulas and transferred to aluminum foul lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

General Procedures for Preparation of Sheet Molding Compound (SMC) Formulations

All the liquid components were weighed individually into a 5 gallon open top container placed on a Toledo balance. The contents of the container were the mixed (in a hood) with a high speed Cowles type dissolver. The agitator was started at a slow speed, then increased to medium speed to completely mix the liquids over a period of 2–3 minutes. The mold release agent and/or fatty acid was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2–3 minutes, the mixer was stopped and ~175 grams of the paste was removed from the container and transferred to a wide-mouthed 4 oz. Bottle. The paste sample was stored in the capped bottle at room temperature and the viscosity measured periodically using a Model HBT 5X Brookfield Synchro-Lectric Viscometer on a Helipath Stand.

The balance of the paste is next added to the doctor boxed on the SMC machine where it is further combined with fiber glass (~1" fibers). The sheet molding compound (SMC) is then allowed to mature to molding viscosity and then molded into the desired article.

MOLDING FACILITIES

18"×18–×0.120" Test Panels

Flat panels for surface evaluation were molded on a 250 ton Lawton Hydraulic press. The press contains a matched die set of 18"×18" chrome plated platens. The female cavity is installed in the bottom and the male portion is at the top. Both mold halves are electrically heated and are controlled on separate circuits so that the mold can be operated at different temperatures. The top and bottom temperature was 300° F. The molding pressure was 1000 psig. The cure time was 90 seconds and the closure speed was 12 in/minute. The charge weight was 1200 grams ("g"). The molds do not contain ejector pins; therefore, the molded panels were removed with a rubber suction cup and the use of a stream of air. The panels were laid on a flat surface, weighted to keep them flat and allowed to cool overnight.

EXAMPLE 1

PRODUCT CHARACTERIZATION

A molding composition comprising 60 phr Ortho UPE, 35 phr LP-4016, 1.3 phr Peroxy ketal, 0.4 phr p-BQ, 8.6 phr Preferably, the Yellowness Index in accordance with the present invention is less than about 50, more preferably less than about 40 and most preferably less than about 30. Often, the Yellowness Index is from about 20 to 30 in accordance with the present invention.

The processing and plateau viscosities were determined on a Brookfield HBT viscometer running at 1 rpm. The TA spindle was used to determine the 3 and 15 minute viscosities whereas the TF spindle was used to determine all the higher viscosities (viscosity values here are about 0.5x that determined on HBT). Paste temperature was held at 80° F. throughout the 30 day testing period.

Table I below sets forth the yellowing resistance of the BMC samples tested.

TABLE I

Yellowing Resistance of Various Substances and Their Mixtures In BMC

| Experiment | 1 (phr) | 2 (phr) | 9 (phr) | 7 (phr) | 6 (phr) | 4 (phr) | 3 (phr) | 5 (phr) | 10 (phr) | 11 (phr) | 8 (phr) |
|---|---|---|---|---|---|---|---|---|---|---|---|
| Epoxide 1 | — | 4 | — | — | — | 4 | 4 | — | — | — | 4 |
| Epoxide 2 | — | — | 4 | — | — | — | — | — | 4 | 4 | — |
| Primary Antioxidant | — | — | — | 0.4 | — | 0.4 | — | 0.4 | — | 0.4 | 0.4 |
| Secondary Antioxidant | — | — | — | — | 2 | — | 2 | 2 | 2 | 2 | 2 |
| Yellowing Index (5 hrs @ 220° C.) | 51.2 | 43.4 | 50.5 | 37.5 | 38.5 | 33.9 | 35.2 | 31.5 | 41.7 | 33.1 | 23.4 |

Zinc Sulfide, 4 phr ZnSt and 300 phr Calcium Carbonate was used in Example 1. To this composition was added the ingredients set forth in Table 1.

The formulations were then compounded into SMC and compression molded into flat panels as described above. Of primary importance to this invention is the Yellowness Index which was determined on all molded panels from the various compounds. Of secondary interest, the following properties were also determined and found acceptable and comparable in all cases: Shrinkage Control; Surface Quality; Flexural Properties; L* Value; Gloss. The details of these properties are commonly known by those skilled in the art and can be readily determined with the proper equipment which is also known to those skilled in the art.

Yellowness Index was determined using a MiniScan™ MS/S 4500 manufactured by Hunter Associates Laboratories, Inc., Reston, Va. As used herein the term "Yellowness Index" means the degree of yellow surface tint a sample exhibits. The Yellowness Index was determined after subjecting the BMC laminates of Table I (hereinafter) to 220° C. over a time interval of 5 hours. The greater the Yellowness Index, the more yellow the appearance.

Experiment #1, with no stabilizers present, gave the worst result. However, the addition of Epoxide 2 (#9) did little to improve performance. Epoxide 1 (#2) had a significant effect by dropping the Yellowness Index 7.8 units to 43.4. The Secondary Antioxidant (#6) and the Primary Antioxidant (#7) also had a significant effect as seen by the drop in the Yellowing Index 38.5 and 37.5, respectively.

Combinations of two of the stabilizers (#4, #3, #5, and #10) decreased the Yellowness Index further still. Quite surprisingly, the best yellowing resistance was obtained in Experiment #8 where all three anti-yellowing substances, the epoxide, primary antioxidant and second antioxidant, were present. In fact the performance is dramatically better than expected.

EXAMPLE 2

Various other molding compositions having the compositions set forth in Table II were molded into articles and tested for yellowing resistance.

Table II sets forth the BMC formulas and the results of the yellowing resistance testing.

TABLE II

Yellowing Resistant BMC Formulas and Properties, phr

| Components | A | B | C | D | E | F | G |
|---|---|---|---|---|---|---|---|
| Ortho UPE | 60 | 60 | 60 | 60 | 60 | 60 | 60 |
| XLP-4072 | 40 | 40 | — | — | — | — | — |
| XLP-4074 | — | — | 40 | 40 | — | — | — |

TABLE II-continued

Yellowing Resistant BMC Formulas and Properties, phr

| Components | A | B | C | D | E | F | G |
|---|---|---|---|---|---|---|---|
| LP-4016 | — | — | — | — | 35 | 40 | — |
| Epoxide 1 | — | 3 | — | 3 | — | 3 | — |
| Secondary Antioxidant | — | 2 | — | 2 | — | 2 | — |
| Primary Antioxidant | — | 0.4 | — | 0.4 | — | 0.4 | — |
| Polystyrene | — | — | — | — | — | — | 40 |
| Peroxy ketal | 1.3 | 1.3 | 1.3 | 1.3 | 1.3 | 1.3 | 1.3 |
| p-BQ | 0.4 | 0.4 | 0.4 | 0.4 | 0.4 | 0.4 | 0.4 |
| 70% Zinc Sulfide Dispersion | — | — | — | — | 8.6 | 8.6 | 8.6 |
| Zn St | 3 | 3 | 3 | 3 | 3 | 3 | 3 |
| VR-3 | 1 | 1 | 1 | 1 | 1 | 1 | 1 |
| Calcium Carbonate | 250 | 250 | 250 | 250 | 300 | 250 | 250 |
| 20% chopped fiberglass by weight | | | | | | | |
| Yellowing Resistance | | | | | | | |
| $X_I$, initial | 4.0 | 2.7 | 2.4 | 2.9 | 2.4 | 2.9 | 3.9 |
| $Y_I$ after 5 hours @ 220° C. | 52.5 | 27.5 | 44.4 | 22.2 | 47.0 | 22.5 | 63.5 |

The yellowing resistance of the polyvinyl acetate based formulations ("A" through "F") was better than polystyrene ("G") at a $Y_I$=63.5. Quite surprisingly, comparing "A" with "B", "C" with "D", and "E" with "D", the benefit of using the combination of cycloaliphatic epoxide, the phosphite and the phenolic antioxidant is quite significantly better in the prevention of yellowing. In all cases, the $Y_I$ has been cut approximately in half. Though not shown in the data the use of the primary antioxidant by itself in these formulas reduced the $Y_I$ to only about 38. Therefore the further reduction of $Y_I$ to the 22–27 range unexpectedly appears to be attributable to the combination of cycloaliphatic epoxide, the primary antioxidant, and the secondary antioxidant.

In addition to the specific aspects of the invention described above, those skilled in the art will recognize that other aspects of the invention are intended to be included within the scope of the claims which follow.

We claim:

1. A molding composition comprising:
   (i) an unsaturated thermosetting resin;
   (ii) an olefinically unsaturated monomer which is copolymerizable with the unsaturated thermosetting resin;
   (iii) at least one antioxidant selected from the group consisting of hindered phenols, phosphites, phosphines, phosphonites, thioethers, arylamines, hindered amines, hydroxyamines and mixtures thereof; and
   (iv) an effective amount of an epoxy compound having at least one 1,2-epoxy group per molecule to enhance the yellowing resistance of an article molded from said molding composition.

2. The molding composition of claim 1 wherein at least one antioxidant is a primary antioxidant effective to donate hydrogen radicals to deactivate polymer free radicals present in articles molded from the molding compositions.

3. The molding composition of claim 2 further comprising a secondary antioxidant.

4. The molding composition of claim 1 wherein at least one antioxidant is a secondary antioxidant effective to decompose hydroperoxides present in articles molded from the molding compositions.

5. The molding composition of claim 2 wherein the primary antioxidant is a hindered phenol.

6. The molding composition of claim 5 wherein the primary antioxidant is selected from the group consisting of tetrakis methane and acetdecyl 3,5-di-tert-butyl-4-hydroxyhydrocinnamate and mixtures thereof.

7. The molding composition of claim 4 wherein the secondary antioxidant is a phosphite.

8. The molding composition of claim 7 wherein the secondary antioxidant is selected from the group consisting of alkyl phosphites, aryl phosphites, and alkyl-aryl phosphites.

9. The molding composition of claim 8 wherein the secondary antioxidant is tris(nonylphenyl) phosphite.

10. The molding composition of claim 1 wherein the epoxy compound is a cycloaliphatic epoxide.

11. The molding composition of claim 1 wherein the epoxy compound is essentially free of reactive unsaturation.

12. The molding composition of claim 1 wherein the epoxy compound has the structure

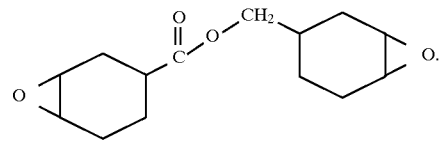

13. The molding composition of claim 1 wherein the epoxy compound has the structure

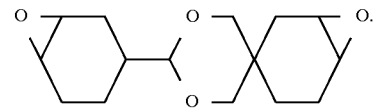

14. The molding composition of claim 1 wherein the epoxy compound has the structure

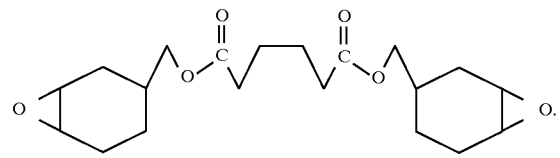

15. The molding composition of claim 1 wherein the epoxy compound has the structure:

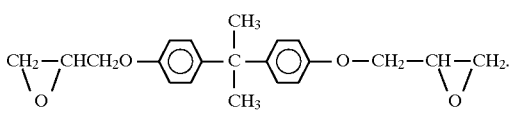

16. The molding composition of claim 1 wherein the epoxy compound has the structure:

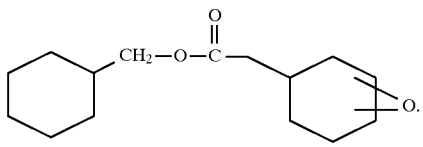

17. The molding composition of claim 1 wherein the epoxy compound is epoxidized pentaerythritol tetratallate.

18. The molding composition of claim 1 wherein the epoxy compound is epoxidized soy bean oil.

19. The molding composition of claim 1 wherein the epoxy compound is octyl epoxytallate.

20. The molding composition of claim 1 wherein the epoxy compound is epoxidized linseed oil.

21. The molding composition of claim 1 further comprising a thermoplastic additive.

22. The molding composition of claim 21 wherein the thermoplastic additive is a polyvinyl acetate homopolymer or copolymer having a weight average molecular weight of from about 50,000 to 180,000 grams per gram mole.

23. The molding composition of claim 1 which comprises from about 1 to 5 phr of the epoxy compound.

24. The molding composition of claim 2 which comprises from about 0.1 to 2 phr of the primary antioxidant.

25. The molding composition of claim 3 which comprises from about 0.5 to 5 phr of the secondary antioxidant.

26. The molding composition of claim 1 which further comprises a white pigment.

27. An article molded from the molding composition of claim 1.

28. The article of claim 27 which has a Yellowness Index of less than about 40.

29. The article of claim 28 which has a Yellowness Index of less than about 30.

30. A molding composition comprising:
(i) from about 20 to 60 phr of an unsaturated polyester;
(ii) from about 30 to 65 phr of an olefinically unsaturated monomer which is copolymerizable with the unsaturated polyester;
(iii) from about 0.1 to 2 phr of a hindered phenol antioxidant;
(iv) from about 0.5 to 5 phr of a phosphite antioxidant; and
(v) from about 1 to 5 phr of an cycloaliphatic epoxy compound having at least one 1,2-epoxy group per molecule.

31. A process for molding an article comprising:
(A) forming a molding composition comprising:
(i) an unsaturated thermosetting resin;
(ii) an olefinically unsaturated monomer which is copolymerizable with the unsaturated thermosetting resin;
(iii) at least one antioxidant selected from the group consisting of hindered phenols, phosphites, phosphines, phosphonites, thioethers, arylamines, hindered amines, hydroxyamines and mixtures thereof; and
(iv) an effective amount of an epoxy compound having at least one 1,2-epoxy group per molecule to enhance the yellowing resistance of said article; and
(B) molding the molding composition at an effective pressure, temperature and time to form said article.

32. The process of claim 31 wherein the pressure is from about 30 to 2000 psig.

33. The process of claim 31 wherein the temperature is from about 80° to 180° C.

34. A method for enhancing the yellowing resistance of a molded article comprising using to mold said article, a molding composition comprising:
(i) an unsaturated thermosetting resin;
(ii) an olefinically unsaturated monomer which is copolymerizable with the unsaturated thermosetting resin;
(iii) at least one antioxidant selected from the group consisting of hindered phenols, phosphites, phosphines, phosphonites, thioethers, arylamines, hindered amines, hydroxyamines and mixtures thereof: and
(iv) an effective amount of an epoxy compound having at least one 1,2-epoxy group per molecule to enhance the yellowing resistance of said article.

35. The method of claim 34 wherein at least one antioxidant is a primary antioxidant effective to donate hydrogen radicals to deactivate polymer free radicals present in said article.

36. The method of claim 35 further comprising a secondary antioxidant.

37. The method of claim 36 wherein the secondary antioxidant is effective to decompose hydroperoxides present in said article.

38. An additive composition comprising:
(i) from about 1 to 50 weight percent of at least one antioxidant selected from the group consisting of hindered phenols, phosphites, phosphines, phosphonites, thioethers, arylamines, hindered amines, hydroxyamines and mixtures thereof; and
(ii) from about 50 to 99 weight percent of an epoxy compound having at least one 1,2-epoxy group per molecule; said additive composition effective to enhance the yellowing resistance of an article molded from said additive composition, said percentages based on the total weight of the additive composition.

39. The additive composition of claim 38 wherein at least one antioxidant is a primary antioxidant effective to donate hydrogen radicals to deactivate polymer free radicals present in the article.

40. The additive composition of claim 39 wherein the primary antioxidant is a hindered phenol.

41. The additive composition of claim 40 wherein the primary antioxidant is selected from the group consisting of tetrakis methane and acetdecyl 3,5-di-tert-butyl-4-hydroxyhydrocinnamate and mixtures thereof.

42. The additive composition of claim 38 further comprising a secondary antioxidant.

43. The additive composition of claim 42 wherein the secondary antioxidant is effective to decompose hydroperoxides present in the article.

44. The additive composition of claim 43 wherein the secondary antioxidant is a phosphite.

45. The additive composition of claim 44 wherein the secondary antioxidant is selected from the group consisting of alkyl phosphites, aryl phosphites, and alkyl-aryl phosphites.

46. The additive composition of claim 45 wherein the secondary antioxidant is tris(nonylphenyl) phosphite.

47. The additive composition of claim 38 wherein the epoxy compound is a cycloaliphatic epoxide.

48. The additive composition of claim 47 wherein the epoxy compound has the structure

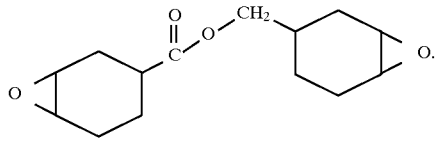

49. The additive composition of claim 38 further comprising a thermoplastic additive.

50. The additive composition of claim 49 wherein the thermoplastic additive is a polyvinyl acetate homopolymer or copolymer having a weight average molecular weight of from about 50,000 to 180,000 grams per gram mole.

51. The additive composition of claim 38 further comprising styrene.

52. A molding composition comprising:
  (i) an unsaturated thermosetting resin;
  (ii) an olefinically unsaturated monomer which is copolymerizable with the unsaturated thermosetting resin;
  (iii) at least one primary antioxidant;
  (iv) at least one secondary antioxidant; and
  (v) an effective amount of an epoxy compound having at least one 1,2-epoxy group per molecule to enhance the yellowing resistance of an article molded from said molding composition.

* * * * *